UNITED STATES PATENT OFFICE.

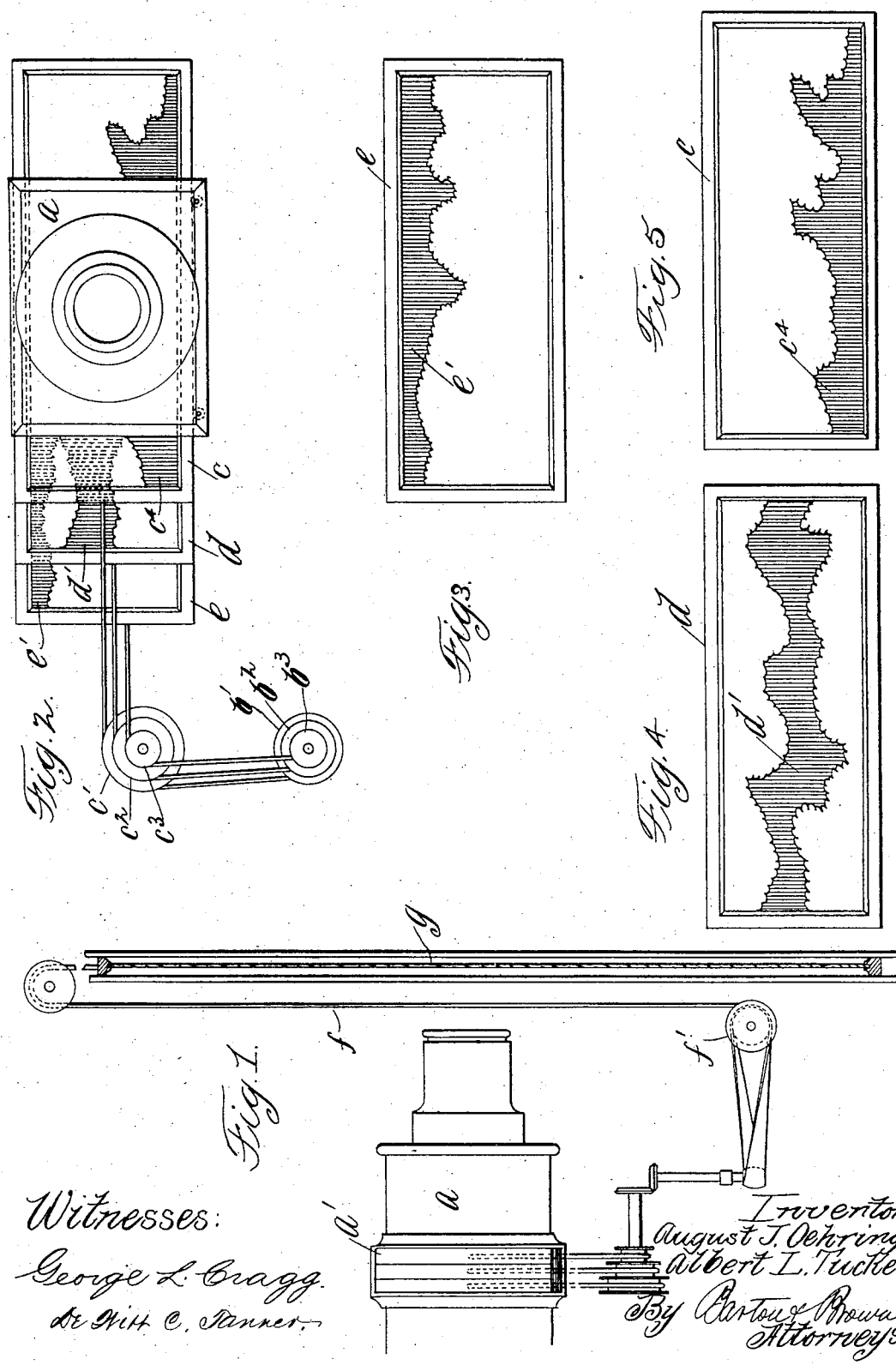

AUGUST J. OEHRING AND ALBERT L. TUCKER, OF CHICAGO, ILLINOIS, ASSIGNORS TO THE WESTERN ELECTRIC COMPANY, OF SAME PLACE.

SCENIC-THEATER APPARATUS FOR PRODUCING CLOUD EFFECTS.

SPECIFICATION forming part of Letters Patent No. 563,303, dated July 7, 1896.

Application filed May 18, 1895. Serial No. 549,848. (No model.)

*To all whom it may concern:*

Be it known that we, AUGUST J. OEHRING and ALBERT L. TUCKER, citizens of the United States, residing at Chicago, in the county of Cook and State of Illinois, have invented a certain new and useful Improvement in Scenic-Theater Apparatus for Producing Cloud Effects, (Oehring, Case No. 12, and Tucker, Case No. 5,) of which the following is a full, clear, concise, and exact description, reference being had to the accompanying drawings, forming a part of this specification.

Our invention relates to scenic-theater apparatus, and more particularly to apparatus for producing a cloud effect. The object of our invention is to provide means for producing the appearance of clouds moving through the air at different heights, or for producing the appearance of clouds changing in outline and size.

Our invention, in its simplest form, comprises a pair of transparent slides, each slide being provided with an opaque portion having a wavy contour, the opaque portions on the slides being so situated that when the slides are placed side by side a transparent space bounded by wavy lines is left between the boundaries of the opaque portions. The slides being placed in the path of light projected upon a curtain, a body of light having the outline of the transparent space and the appearance of a cloud is thrown upon the curtain. By moving the slides relatively the appearance of clouds changing in outline and size is produced. By providing a number of slides a number of clouds may be produced, and by moving the several slides at different rates of speed the clouds may be made to appear to travel at different rates of speed, thus suggesting clouds moving at different heights. By providing a color-screen in the path of the projected light the cloud may be colored of any desired color, and the color may be changed, as from light to dark, to present the appearance of a brewing storm.

We will describe our invention in connection with the accompanying drawings, in which—

Figure 1 is a view in elevation of apparatus embodying our invention. Fig. 2 is a view illustrating the slides of the apparatus in position. Figs. 3, 4, and 5 are individual views of the slides, illustrating the location of the clouds on each.

Like letters refer to like parts in the several figures.

We will illustrate our invention in connection with a three-slide arrangement.

The slides are adapted to travel in a passage $a'$ in the projecting lantern $a$, the slides consisting each of a frame containing a plate of glass, upon which is provided the opaque portion adapted to coact with opaque portions upon the other slides to produce the cloud appearance. To the frames are secured cords which wind about drums $b'\ b^2\ b^3$ of different diameters, so that the slides may travel at different rates. Idlers $c'\ c^2\ c^3$ are shown in the present instance, over which the cords pass before winding about the drums. The drums may be driven by any suitable mechanism. Upon one of the slides $c$ (the front one shown in Fig. 2) the opaque portion $c^4$ is provided at the bottom, the upper contour of the opaque portion being wavy, to simulate the wavy outline of a cloud. Upon the slide $d$, just behind the slide $c$, the opaque portion $d'$ is provided near the middle, the lower edge being formed wavy and situated relatively to the outline of the opaque portion of slide $c$, so that the transparent portion between the two bounding-lines will have the general outline of a cloud.

When the slides are placed in the path of the projected light, a body of light will be thrown upon the curtain, which will present the appearance of a cloud. The upper edge of the opaque portion $d'$ is also wavy and coacts with the wavy edge of the opaque portion $e'$ on slide $e$ to form another transparent portion of the general outline of a cloud. When the slides are given relative motions, the clouds appear to change in outline, as when shifted by the wind, and, if the slide $c$ be moved at a faster rate than slide $e$, the upper clouds will appear to move faster than the lower, thus suggesting the movement of the clouds at different heights.

The opaque portions may be provided upon the slides in any preferred manner. We preferably, however, photograph the opaque portions onto transparent glass plates, as in this manner the edges of the opaque portions may be made partially transparent to render the edges of the clouds less distinct. When, however, it is desired to represent clouds as they appear just before a storm, the edges of the opaque portion may be sharply defined. Another manner of producing the opaque portions is by a sand-blast. When this means is employed, the edges may be likewise rendered partially transparent.

In the path of the rays from the lamp $a$ is provided a color-screen $g$, which is variously colored and moved across the path of the projected light to color the body of light thrown upon the curtain in the desired degree. The curtain may be moved automatically, as by a cord $f$, winding about a driven drum $f'$, whereby the changes of color may be produced in a predetermined manner.

By the provision of the color-screen, any desired color or combination of colors may be given to the cloud, and by the movement of the curtain the colors may be varied, as from light to dark, to present the appearance of darkening clouds as they appear before a storm.

Having thus described our invention, what we claim as new, and desire to secure by Letters Patent, is—

1. The herein-described method of producing the appearance of clouds changing in form, which consists in projecting light upon a surface, interposing in the path of the projected light opaque bodies having irregular contours situated at a distance apart to permit the passage between the contours of a body of light of irregular outline to present upon the projecting surface the appearance of a cloud or clouds, and then moving said opaque bodies relatively to each other to vary the form of the space between the irregular contours; whereby the appearance of clouds changing in form is produced upon the projecting surface, substantially as described.

2. The combination with a lantern adapted to project light upon a curtain or surface, of a slide carrying an opaque portion provided with an irregular outline or contour, a second slide carrying an opaque portion provided with an irregular outline, said slides being placed in position to form a space of cloud-like form between the irregular outlines of the two slides, and means for moving said slides relatively to each other in the path of the light projected from said lantern to vary the form of the space between the irregular outlines of the slides; whereby the light thrown upon the curtain is changed in form to present the appearance of clouds changing in form, substantially as described.

3. The combination with a lantern adapted to project light upon a curtain or surface, of a slide carrying a central opaque portion having irregular upper and lower edges, a slide carrying at its upper end an opaque portion having an irregular lower edge, a slide carrying at its lower end an opaque portion having an irregular upper edge, spaces of irregular outline being thus left between the irregular edges of the central opaque portion carried by the one slide and the upper and lower opaque portions carried by the other two slides, and means for moving said slides at different rates of speed in the path of the light projected from said lantern, to thus vary the forms of the spaces between the irregular edges of the several portions to change the forms of the bodies of light projected upon the curtain; whereby the appearance of clouds changing in form is produced; substantially as described.

In witness whereof we hereunto subscribe our names this 22d day of September, A. D. 1894.

AUGUST J. OEHRING.
ALBERT L. TUCKER.

Witnesses:
W. CLYDE JONES,
GEORGE L. CRAGG.